United States Patent [19]

Baumann

[11] 4,220,449
[45] Sep. 2, 1980

[54] QUATERNATED POLYAMINE SALTS

[75] Inventor: Hans-Peter Baumann, Allschwil, Switzerland

[73] Assignee: Sandoz Ltd., Basel, Switzerland

[21] Appl. No.: 779,840

[22] Filed: Mar. 21, 1977

Related U.S. Application Data

[63] Continuation of Ser. No. 554,481, Mar. 3, 1975, abandoned.

[30] Foreign Application Priority Data

Mar. 8, 1974 [CH] Switzerland ............... 3285/74

[51] Int. Cl.² .................................. D06P 5/06
[52] U.S. Cl. ...................... 8/606; 260/567.6 M; 260/567.6 P
[58] Field of Search ............ 8/172, 84; 260/567.6 P, 260/567.6 M

[56] References Cited

U.S. PATENT DOCUMENTS

| | | | |
|---|---|---|---|
| 2,891,835 | 6/1959 | Matter et al. ............... | 8/1 |
| 2,986,444 | 5/1961 | Rohohe ....................... | 8/84 |
| 3,079,436 | 2/1963 | Hwa ........................... | 260/567.6 P |
| 3,560,142 | 2/1971 | Keller ......................... | 8/172 |
| 3,846,070 | 11/1974 | Langmann et al. ......... | 8/172 |

FOREIGN PATENT DOCUMENTS 1080563  4/1960  Fed. Rep. of Germany .... 260/567.6 P

OTHER PUBLICATIONS

Chem. Abst. vol. 71, 1969, Abstract 227972 M and vol. 54, 1960, 22424f.
Farbwerke Hoechst A.G., Fine Chemicals Patents Journal 6, No. 32, British 3:4 (8-12/66) British Pat. No. 1,036,090.

Primary Examiner—Paul R. Michl
Attorney, Agent, or Firm—Gerald D. Sharkin; Richard E. Vila; Thomas C. Doyle

[57] ABSTRACT

Quaternated polyamine salts of formula,

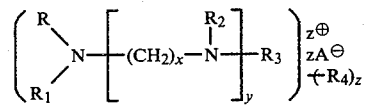

in which
R signifies alkyl, alkenyl, phenylakyl or naphthylalkyl,
$R_1$ signifies phenylalkyl or naphthylalkyl,
x and y signify integers, and additionally y signifies O,
each $R_2$ and $R_3$, independently, has one of the significances of $R_1$ or signifies a group, at least one being present, of formula

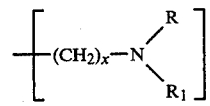

wherein x, R and $R_1$, are as above.
each $R_4$, independently, signifies a quaternating $C_{1-6}$ alkyl radical,
z signifies a number in the range 0.5 to 1.8, being an average number of quaternated nitrogen atoms per molecule,
and each $A^\ominus$, independently, signifies an anion, are useful as levelling agents in the dyeing with basic dyestuffs of polyacrylonitrile-containing fibrous materials.

10 Claims, No Drawings

QUATERNATED POLYAMINE SALTS

This is a continuation of application Ser. No. 554,481 filed Mar. 3, 1975, now abandoned.

The present invention relates to organic compounds, more particularly quaternated polyamine salts, and their use as dyeing aids.

Accordingly there are provided compounds of formula I,

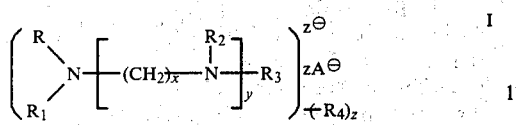

in which

R signifies a $C_{10-22}$ alkyl, $C_{10-22}$ alkenyl, phenyl-$(C_{1-3})$ alkyl or naphthyl-$(C_{1-3})$ alkyl radical, $R_1$ signifies a phenyl-$(C_{1-3})$ alkyl or naphthyl-$(C_{1-3})$ alkyl radical, x signifies an integer 2 to 8, y signifies 0 or an integer 1 to 5, each $R_2$ and $R_3$, independently, has one of the significances of $R_1$ or signifies a group of formula II,

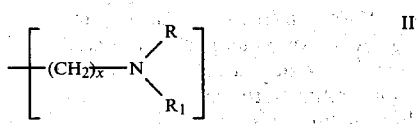

wherein x, R and $R_1$ are as defined above, any repeating R, $R_1$ and groups of formula II being independent from each other, and at least one of $R_2$ or the $R_2$'s and $R_3$ signifying a group of formula II, each $R_4$, independently, signifies a quaternating $C_{1-6}$ alkyl radical, z signifies a number in the range 0.5 to 1.8, being an average number of quaternated nitrogen atoms per molecule, and each $A^\ominus$, independently, signifies an anion.

Suitable anions $A^\ominus$ in the compounds of the present invention are those which do not adversely affect the desired dyeing aid properties thereof, e.g. $Cl^\ominus$, $Br^\ominus$, $I^\ominus$, $SO_4^{2\ominus}$, $CH_3SO_4^\ominus$ and $C_2H_5SO_4^\ominus$.

In the compounds of formula I, any molecule is preferably terminated at both ends by a group of formula III,

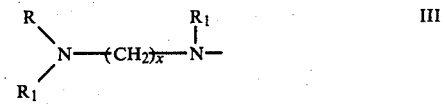

Independently of the above mentioned preferred feature, and considering each significance independently, the preferred significance for R is phenyl-$(C_{1-3})$alkyl, for $R_1$ is phenyl-$(C_{1-3})$alkyl, for x is 2, for y is 1 or 2, and for z is a number in the range 0.75 to 1.25, more preferably 1.

When R and/or $R_1$ signifies a phenyl-$(C_{1-3})$alkyl radical, this is preferably a benzyl radical, and a quaternating $C_{1-6}$ alkyl radical is preferably a $C_{1-4}$ alkyl radical, more preferably a methyl radical.

Of the compounds of formula I, a preferred class is constituted by those of formula Ia,

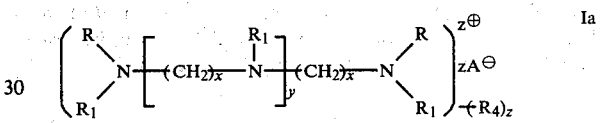

in which R, $R_1$, x, y, $R_4$, z and $A^\ominus$ are as defined above.

Of the compounds of formula Ia, a preferred class is constituted by those of formula Ib,

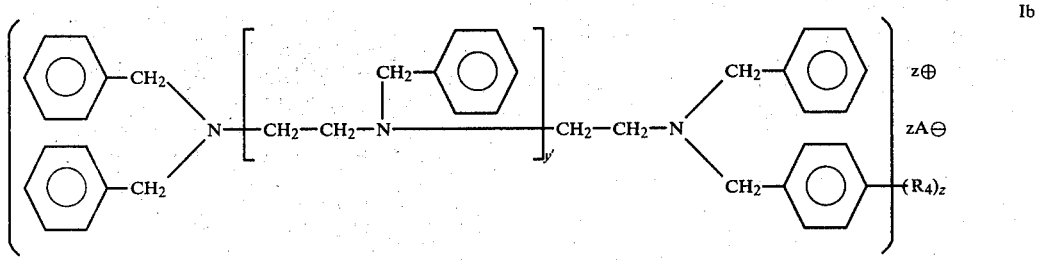

in which $R_4$, z and $A^\ominus$ are as defined above, and y' signifies 1 or 2.

Preferably z signifies a number in the range 0.75 to 1.25, more preferably 1, and $R_4$ preferably signifies a methyl radical.

A preferred class of compounds of formula Ib is constituted by those of formula Ic,

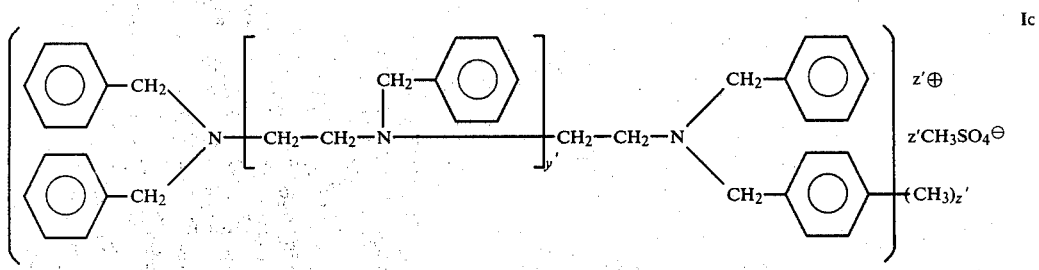

in which y' signifies 1 or 2, z' signifies a number in the range 0.75 to 1.25.

More preferably, z' signifies 1 in the compound of formula Ic.

The present invention further provides a process for the production of a compound of formula I, which comprises quaternating from 0.5 to 1.8 nitrogen atoms on average in a basic polyamine of formula I',

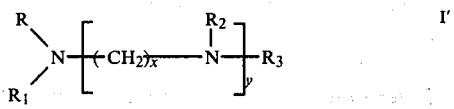

in which R, $R_1$, x, y, $R_2$ and $R_3$ are as defined above, with one or more alkylating agents containing $C_{1-6}$ alkyl radicals as the alkylating groups preferably in a molar ratio of polyamine to alkylating agent of 1:0.5-1.8.

Preferred alkylating agents are alkyl halides, particularly methyl chloride, and dialkyl sulphates, particularly dimethyl sulphate.

As the degree of quaternisation in the process of the invention is low, this has the advantage of enabling the reaction mixture to be readily stirred during the production and processing stages.

The basic polyamines of formula I', as indicated in British Patent Specification No. 1,160,938, may be obtained by reacting a compound of formula IV,

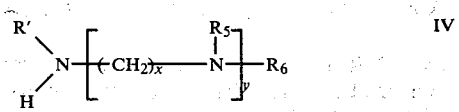

in which x and y are as defined above,

R' signifies a hydrogen atom or a $C_{10-22}$ alkyl or $C_{10-22}$ alkenyl radical, each $R_5$ and $R_6$, independently, signifies a hydrogen atom or a group of formula V

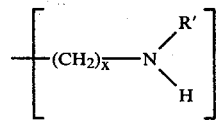

wherein x and R' are as defined above, any repeating R' being independent from any other, and at least one of the $R_5$'s and $R_6$ signifying a group of formula V, with one or more aralkylating agents containing phenyl-($C_{1-3}$)alkyl and/or naphthyl-($C_{1-3}$) alkyl radicals as the aralkylating groups, such that all free hydrogen atoms in the compound of formula IV are replaced in the basic polyamine product by phenyl-($C_{1-3}$)alkyl and/or naphthyl-($C_{1-3}$) alkyl radicals.

When the preferred compounds of formula Ia are ultimately required, the compound of formula IV used in the process will be of formula IVa,

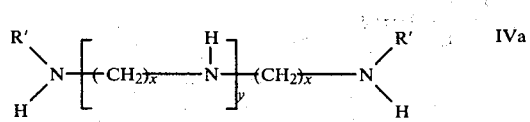

in which R', x and y are as defined above.

Examples of compounds of formula IVa are ethylene diamine, propylene diamine, hexylene diamine, diaminooctane, diethylene triamine, dipropylene triamine, $N^1,N^3$-dilauryl dipropylene triamine, $N_1$-stearyl dipropylene triamine, dihexylene triamine and $N^1,N^6$-dipalmityl pentaethylene hexamine.

The quaternated polyamine salts of the present invention are useful as dyeing aids, more especially as levelling agents, in the dyeing with basic dyestuffs of polyacrylonitrile-containing fibrous materials, especially textiles. As will be appreciated, the fibrous materials may consist entirely of polyacrylonitrile fibre, or may consist of a mixture of polyacrylonitrile fibres with one or more other kinds of fibrous material. When applied with a dyestuff to the fibrous material, the salts have an affinity therefore and thereby inhibit excessive localised build-up of the dyestuff on the polyacrylonitrile-containing fibrous material. Thus the dyeing produced is of a more uniform nature than would have been the case without the levelling agent.

Accordingly the present invention further provides a method of dyeing a polyacrylonitrile-containing fibrous material with a basic dyestuff characterised in that said dyeing is affected in the presence of a compound of formula I, as defined above, as a levelling agent.

Suitable basic dyestuffs whose dyeing of polyacrylonitrile fibres is aided by the quaternary salts of the present invention include hydro-soluble cationic dyestuffs, e.g. those containing ammonium, etherified hydroxyammonium, hydrazinium, cycloimmonium, oxonium, sulphonium or isothiouronium groups, and the diphenyl- and triphenyl-methane dyes. The quaternary salts of the present invention are particularly useful in aiding the dyeing of the basic dyestuff in the mono- and polyazo, the anthraquinone, the styryl, the azomethine and the oxazine series, which dyestuffs are usually free of sulphonic acid groups.

Several of the aforementioned dyestuffs have a high affinity towards polyacrylonitrile fibres. Due to their high autoaffinity to these fibres the quaternary salts are especially useful as levelling agents for such dyestuffs.

The fibrous material to be dyed according to the method of the present invention may be in any form, e.g. in the form of loose fibres, yarn or fabric. It may consist of pure polyacrylonitrile or mixed polymers containing a large proportion of polyacrylonitrile, e.g. mixed polymers of acrylonitrile with vinyl alcohol, vinyl acetate, acrylic and methacrylic acid esters, acrylic acid amides or vinyl chloride.

The dyeing method of the present invention may be effected under conditions usually employed in the dyeing of polyacrylonitrile fibres with the basic dyes with respect to the amount of dyestuff, the dyeing temperature and the liquor ratio used. Thus elevated temperatures, e.g. 90° C. and 100° C., are used, and under static pressure the temperature range 100°-120° C. is often employed.

The quaternary salts of the present invention may be added to the dyebath before or during the dyeing process, and it is also appropriate in certain cases to pretreat the fibrous material with the quaternary salt prior to its dyeing. The amount of quaternary salt employed in a given case will depend on the particular conditions used, including the amount and nature of the dyestuff and of the fibrous material to be dyed. As an example, the amount of quaternary salts to be added to the dyebath for treating a given weight of fibrous material is in the range 0.02 to 2% of the weight of the material.

The quaternary salts may be employed in the method as pure compounds or as mixtures whose separation into the constituents is deemed unnecessary, such as mixed products from the process of the present invention. Furthermore they may be used in the method alone or in the presence of surface-active agents, e.g. the addition products of ethylene oxide and fatty acid amines, fatty alcohols or alkyl phenols. Preferably they are used with surface-active mono- or di-alkyl phenol polyglycolic ethers which are liquid at 22° C. and have 8–25 ethyleneoxy and/or propyleneoxy units per molecule. More preferably, such surface-active agents contain only ethyleneoxy units and alkyl radicals containing 4–10, or more especially 8 or 9 carbon atoms an example thereof being an addition product of ethylene oxide and isooctyl phenol in a molar ratio 10:1. Suitably the quaternary salts of the present invention are added to the dyeing bath in the form of a solution in such aforementioned surface-active agents, and such solutions also form part of the present invention. Generally in concentration by weight of the quaternary salt in the liquid surface-active mono- or di-alkyl phenol polyglycolic ether to give a clear solution is in the range 20 to 35%.

The above described solutions are readily miscible in water, giving clear solutions. Such aqueous solutions may be added to the dyebath as a convenient means by which to introduce the quaternary salt and the surface-active agent, and also form part of the present invention. If, instead of the alkyl phenol polyglycolic ethers, castor oil poly(30)glycolic ether or lauryl alcohol poly(10)glycolic ether are used as surface-active agents, the corresponding solutions in water are disadvantageously turbid.

Levelling agents have generally been added to dyebaths as solutions in water and isopropanol. Compared with such solutions, the solutions of the quaternary salts of the present invention in alkyl phenol polyglycolic ethers are advantageously less inflammable.

As well as surface-active agents, other additives normally used in dyeing processes with basic dyestuffs may be present, e.g. salts such as sodium sulphate, chloride or acetate, acids such as acetic acid, and/or buffer solutions.

Basic dyestuffs have been given compatability values, on a scale from 1 to 5, as a measure of their behaviour in regard to build-up and levelling power in the presence of other basic dyestuffs (Journal of the Society of Dyers and Colourists, February 1971, pages 60 and 61 and June 1972, pages 220 and 221). It has been found that basic dyes with high affinities to polyacrylonitrile fibres have compatability values (C) 1 to 2. In the method of the present invention the quaternary salts are particularly suited to be used with basic dyes with a C-value of 1. Examples of basic dyes with C-values of 1 to 2 are the following:

Table 1

| Dye No. | Dyestuff | Colour | C-Value |
|---|---|---|---|
| 1 | [structure] | red | 1 |
| 2 | [structure] | red | 1 |
| 3 | [structure] | violet | 1 |
| 4 | [structure] | blue | 1 |

Table 1-continued

| Dye No. | Dyestuff | Colour | C-Value |
|---|---|---|---|
| 5 | (structure) | yellow | 1 |
| 6 | (structure) | blue | 1 |
| 7 | (structure) | red | 1.5 |
| 8 | (structure) | blue | 1 |
| 9 | (structure) | red | 2 |
| 10 | (structure) | violet | 2 |
| 11 | (structure) | red | 1 |

Table 1-continued

| Dye No. | Dyestuff | Colour | C-Value |
|---|---|---|---|
| 12 | [structure: imidazoline with N-CH₃ groups, ⊕N, connected via -N=N- to phenyl-N(C₂H₅)(C₂H₄-O-naphthyl)] Cl⊖ | red | 1 |
| 13 | [structure: imidazoline with N-CH₃ groups, ⊕N, connected via -N=N- to phenyl-N(C₂H₅)(C₂H₄-O-dibenzofuranyl)] Cl⊖ | red | 1 |

The invention is illustrated by the following Examples, in which temperatures are expressed in degrees Centigrade and the parts and percentages are by weight.

PRODUCTION EXAMPLE 1

Step 1

73.0 Parts of triethylene tetraamine (approx. 20°) are introduced into a reaction flask. 50.0 Parts of water (approx. 20°) are added while stirring continuously. The temperature of the contents in the flask rises to approximately 40°. 190.0 Parts of benzyl chloride are subsequently added dropwise such that the temperature of the reaction mixture is between 80° and 90° and does not exceed 100°. This is achieved by cooling or alteration of the velocity of the dropwise addition. After stirring for 1 hour at temperatures between 95°–100°, 200 parts of aqueous 30% sodium hydroxide solution are added, the temperature of the contents in the flask not falling below 80°. The mixture is then stirred at temperatures between 95°–100° for 1½ hours, the second portion of 190.0 parts of benzyl chloride subsequently being added dropwise in the same way as the first portion. The mixture is also stirred for 1 hour at 95°–100° and 207.0 parts of sodium hydroxide solution (30%, aqueous) are then added all at once, stirring is continued for 1½ hours at 95°–100° and then discontinued. The reaction product separates from the concentrated aqueous sodium chloride solution within about 10 minutes, occupying the upper phase. The lower colourless to white salt solution is discharged. By stirring and passage of a slow N₂-current, the pressure in the reaction flask is decreased to 30–40 mm Hg at 90°–95° internal temperature. Residual water and small amounts of benzyl alcohol distil over and 343 parts of the benzylation product are obtained.

STEP 2

The total amount of the benzylation product obtained in step 1 is cooled to approximately 60°. 79.0 parts of dimethyl sulphate are then added dropwise while stirring well and continuously such that the temperature of the contents in the flask is between 90° and 95° and does not exceed 100°. This is achieved by cooling for approximately 15 minutes. As soon as the internal temperature starts to decrease after the addition of dimethyl sulphate, the mixture is heated, the internal temperature kept at 95°–100° and stirring is effected for 45–60 minutes. 422 Parts of the product of formula (Ic), wherein y' is 2 and z' is 1.25, are obtained.

Step 3

783.25 Parts of iso-octyl phenolpoly (10) glycolic ether are added to the quaternary reaction mixture (422 parts) at about 95° at such a rate that the temperature does not fall below 80°. The mixture is then stirred at 80° until a clear solution is obtained to which 200.8 parts of demineralised water are subsequently added with stirring. The mixture is cooled to a temperature between 20° and 30° and discharged.

1405.8 Parts of an adjuvant containing 30% of the compound of formula (Ic), wherein y' is 2 and z' is 1.25, are obtained.

PRODUCTION EXAMPLE 2

The process is effected in analogy with production Example 1 but the following amounts are used:
51.5 parts of diethylene triamine
50.0 parts of water
158.0 parts of benzyl chloride
166.6 parts of aqueous sodium hydroxide solution (30%)
158.1 parts of benzyl chloride
173.3 parts of aqueous sodium hydroxide solution (30%)
63.0 parts of dimethyl sulphate
630.5 parts of di-amylphenol poly(10) glycolic ether
161.6 parts of demineralised water.

1131.6 Parts of an adjuvant containing 30% of the compound of formula (Ic), wherein y' is 1 and z' is 1, are obtained.

PRODUCTION EXAMPLE 3

In analogy with Examples 1 and 2 there is produced the quaternary salt from
1 mol of tetraethylene pentaamine with
7 mols of benzyl chloride and with
1.8 mol of dimethyl sulphate,
and the adjuvant thereof.

The quaternary salt has the structure of formula (Ic), wherein y' and z' respectively, are replaced by "3" and "1.8".

The adjuvant consists of 30 parts of the quaternary salt, 56 parts of iso-octyl phenol poly(10) glycolic ether and 14 parts of water.

PRODUCTION EXAMPLE 4

In analogy with Examples 1 and 2 there is produced
the quaternary salt from
mol of pentaethylene hexaamine with
mols of benzyl chloride and with
5 mols of dimethyl sulphate,
and the adjuvant thereof.

The salt has the structure of formula (Ic), wherein y'
and z', respectively, are replaced by "4" and "1.5".

The adjuvant consists of 30 parts of the product, 56 parts of iso-octylphenoly poly(10)glycolic ether and 14 parts of water.

PRODUCTION EXAMPLE 5

In analogy with Examples 1 and 2 there is produced
the quaternary salt from
mol of ethylene diamine with
mols of benzyl chloride and with
mol of dimethyl sulphate,
and the adjuvant thereof.

The product has the structure of formula (Ic),
wherein y' is replaced by "0" and z' is 1.

The adjuvant consists of 30 parts of the product, 56 parts of iso-octylphenol poly(10)glycolic ether and 14 parts of water.

DYEING EXAMPLE 1

100 Parts of polyacrylonitrile fabric (Orlon 7) are dyed in 5000 parts of a dyeing bath which, based on the weight of the fabric used, has the following constituents:

% of sodium acetate
% of 40% acetic acid
% of the adjuvant according to Example 1
.5% of dyestuff 4 (commercial dyestuff).

The fabric is introduced at 85°–90° into the dyeing bath which is heated to the boil over the course of approximately 20 minutes. Dyeing is effected at boiling temperature for 60–90 minutes. An evenly dyed blue dyeing with good fastness is obtained. The addition of the adjuvant has a levelling effect on the building-up power of the dyestuff. Without the addition of the adjuvant in accordance with Example 1 the dyeing becomes uneven.

DYEING EXAMPLE 2

Dyeing Example 1 is repeated except that adjuvant 1 according to Example is replaced by the adjuvants according to Examples 2 and 5. Similarly good results are obtained in both cases.

Replacing furthermore dyestuff 4 by the other dyes indicated in Table 1, the even dyeings of similar quality are obtained.

What is claimed is:

1. A polyamine salt of formula

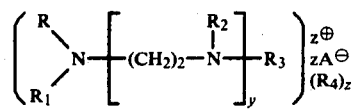

in which

R signifies a $C_{10-22}$ alkyl, $C_{10-22}$ alkenyl, phenyl-($C_{1-3}$)alkyl or naphthyl-($C_{1-3}$)alkyl radical, $R_1$ signifies a phenyl-($C_{1-3}$)alkyl or naphthyl-($C_{1-3}$) alkyl radical, y signifies 0 or an integer 1 to 5, each $R_2$ and $R_3$, independently, has one of the significances of $R_1$ or signifies a group of formula

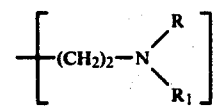

wherein R and $R_1$ are as defined above, any repeating R,$R_1$ and groups of the above formula being independent from each other, and at least one of $R_2$ or the $R_2$'s and $R_3$ signifying a group of the latter above formula each $R_4$, independently, signifies a quaternating $C_{1-6}$ alkyl radical, z signifies a number in the range 0.75 to 1.25, being an average number of quaternated nitrogen atoms per molecule, and each $A^\ominus$, independently, signifies an anion.

2. A quaternary salt according to claim 1, of formula

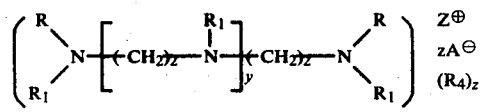

in which R, $R_1$, x, y, $R_4$, z and $A^\ominus$ are as defined in claim 1.

3. A quaternary salt according to claim 2, of formula

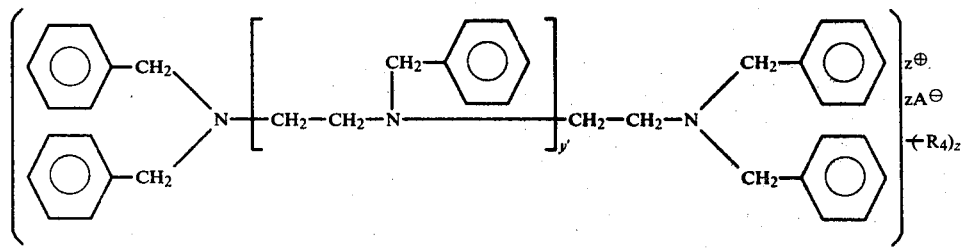

in which $R_4$, z and $A^\ominus$ are as defined in claim 2
and y' signifies 1 or 2.

4. A quaternary salt according to claim 3, of formula

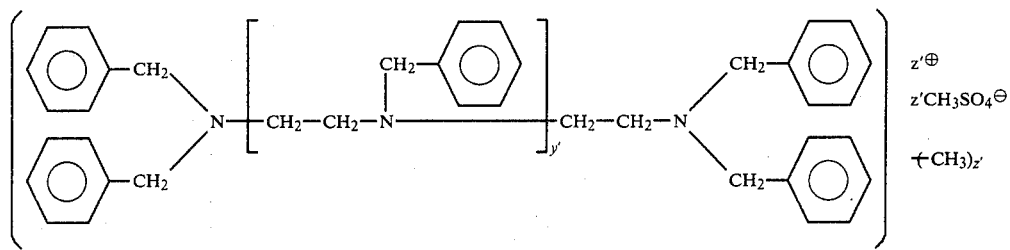

in which
y' signifies 1 or 2,
z' signifies a number in the range 0.75 to 1.25.

5. A quaternary salt according to claim 4, in which z' signifies 1.

6. A solution of a quaternary salt, as claimed in claim 1, in a surface-active mono- or di-alkyl phenol polyglycolic ether which is liquid at 22° C. and has 8–25 ethyleneoxy and/or propyleneoxy units per molecule.

7. A solution according to claim 6, in which the concentration by weight of the quaternary salt in the liquid surface-active mono- or di-alkyl phenol polyglycolic ether is in the range 20 to 35%.

8. An aqueous solution of a solution as claimed in claim 6.

9. A quaternary salt according to claim 4 wherein y' is 2.

10. A quaternary salt according to claim 4 wherein y' is 2 and z' is 1.25.

* * * * *

UNITED STATES PATENT AND TRADEMARK OFFICE
CERTIFICATE OF CORRECTION

PATENT NO. : 4,220,449

DATED : September 2, 1980

INVENTOR(S) : Hans-Peter Baumann

It is certified that error appears in the above—identified patent and that said Letters Patent is hereby corrected as shown below:

Column 12, Claim 1, line 1; after "A" insert --quaternary--.

Column 12, Claim 2, the first line beneath the formula; after "$R_1$" delete "x,".

Column 13, Claim 4, the second line beneath the formula in the definition of "y'"; after "2," insert --and--.

Signed and Sealed this

Twenty-second Day of June 1982

[SEAL]

Attest:

Attesting Officer

GERALD J. MOSSINGHOFF

Commissioner of Patents and Trademarks